(12) United States Patent
Yokoyama

(10) Patent No.: US 9,065,953 B2
(45) Date of Patent: Jun. 23, 2015

(54) IMAGE FORMING APPARATUS, METHOD FOR CONTROLLING THE IMAGE FORMING APPARATUS, AND PROGRAM, WITH MODE SHIFTING BASED ON DURATION REQUIRED FOR SHIFTING AND AMOUNT OF INFORMATION TO BE STORED

(71) Applicant: CANON KABUSHIKI KAISHA, Tokyo (JP)

(72) Inventor: Hidehiko Yokoyama, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/857,738

(22) Filed: Apr. 5, 2013

(65) Prior Publication Data
US 2013/0265604 A1 Oct. 10, 2013

(30) Foreign Application Priority Data

Apr. 9, 2012 (JP) .................................. 2012-088152

(51) Int. Cl.
*H04N 1/00* (2006.01)
(52) U.S. Cl.
CPC .... *H04N 1/00896* (2013.01); *H04N 2201/0094* (2013.01)
(58) Field of Classification Search
USPC .............................................. 358/1.14, 1.15
See application file for complete search history.

(56) References Cited

U.S. PATENT DOCUMENTS

2010/0241888 A1* 9/2010 Kaneko et al. ................. 713/324
2011/0225329 A1* 9/2011 Charna et al. .................... 710/62

FOREIGN PATENT DOCUMENTS

JP 2004-038546 A 2/2004

* cited by examiner

*Primary Examiner* — Qian Yang
(74) *Attorney, Agent, or Firm* — Canon USA, Inc. IP Division

(57) ABSTRACT

An image forming apparatus includes a first volatile storage unit storing information for returning the image forming apparatus to a normal startup state, a second non-volatile storage unit storing the information for returning the image forming apparatus to the normal startup state, and a control unit configured to, if the image forming apparatus being performing normal job processing is shifted to the power-saving mode, switch between a hibernation mode and a quick mode depending on a shift time to the hibernation mode, the hibernation mode in which the control unit causes the second storage unit to store information for performing the normal job processing to shift the image forming apparatus to the power-saving mode, the quick mode in which the control unit causes the first storage unit to store the information for performing the normal job processing to shift the image forming apparatus to the power-saving mode.

9 Claims, 7 Drawing Sheets

| GENERATION TIME | WRITE-BACK TIME | TIME THRESHOLD | SIZE THRESHOLD | DISCRETE THRESHOLD |
|---|---|---|---|---|
| 0.02 | 0.01 | 15 | 400 | 100 |

| COMPRESSION RATE | COMPRESSION TIME | DECOMPRESSION TIME |
|---|---|---|
| 0.5 | 0.07 | 0.05 |

IMAGE FORMING APPARATUS, METHOD FOR CONTROLLING THE IMAGE FORMING APPARATUS, AND PROGRAM, WITH MODE SHIFTING BASED ON DURATION REQUIRED FOR SHIFTING AND AMOUNT OF INFORMATION TO BE STORED

BACKGROUND OF THE INVENTION

1. Field of the Invention

The present invention relates to an image forming apparatus having a power-saving mode, a method for controlling the image forming apparatus, and a program.

2. Description of the Related Art

Recent image forming apparatuses capable of operating as multifunctional devices having a plurality of functions have become mainstream. The apparatuses are provided with a copying function for printing information read from original documents, and further provided with a function for storing image information, a function for sending and receiving electronic data via a public line or a network, and the like.

Meanwhile, there are growing needs for reducing power consumption, especially, if an apparatus is not in operation for a predetermined time, it is expected that the apparatus enters into a power saving state.

With the increasing number of functions, processes for enabling the functions are added to the image forming apparatuses. This inevitably increases the startup time of the apparatuses from power activation to an operable state.

To solve the problem, Japanese Patent Application Laid-Open No. 2004-38546 discusses an application of a hibernation technology to an image forming apparatus.

In the application of the hibernation technology, the apparatus looks as if the apparatus started up from a shutdown state, called a cold boot. The apparatus, however, stores the register contents of a central processing unit (CPU) and a chip, and the contents of a volatile memory in hibernation data immediately before the shutdown. Consequently, if the hibernation data is restored in the register and the volatile memory, the operation state immediately before the shutdown is restored. Accordingly, as compared to the cold boot in which initialization of the hardware and the software is necessary, the startup time can be shortened.

The hibernation technology, however, requires generation of the hibernation data at the time of shutdown and write-back processing of the data in the register and memory at the time of startup. It takes time in some cases depending on the operation state of the apparatus.

SUMMARY OF THE INVENTION

The present invention is directed to an image forming apparatus capable of efficiently performing power-saving control for reducing a startup time in power supply recovery and reducing power consumption.

According to an aspect of the present invention, an image forming apparatus configured to perform control for shifting a power mode, in which power is supplied from a power source, to a power-saving mode includes a first volatile storage unit configured to store information for returning the image forming apparatus to a normal startup state, a second non-volatile storage unit configured to store the information for returning the image forming apparatus to the normal startup state, and a control unit configured to, if the image forming apparatus in a state of performing normal job processing is shifted to the power-saving mode, switch between a hibernation mode and a quick mode depending on a time for shifting to the hibernation mode, the hibernation mode in which the control unit causes the second storage unit to store therein information for performing the normal job processing, and then causes the image forming apparatus to shift to the power-saving mode, the quick mode in which the control unit causes the first storage unit to store therein the information for performing the normal job processing, and then causes the image forming apparatus to shift to the power-saving mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

<Description of System Configuration>

Figure 1:
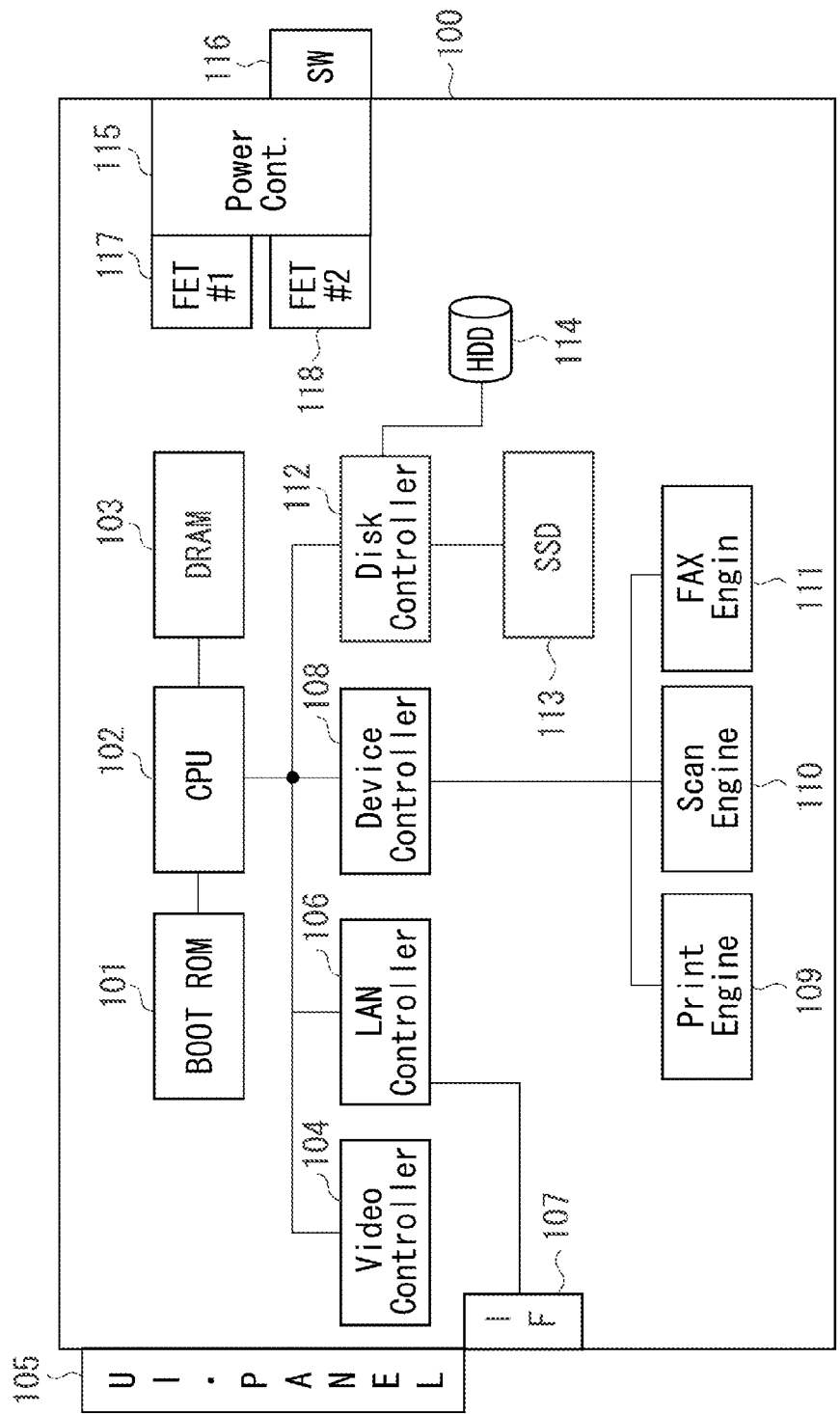
FIG. 1 is a block diagram illustrating an internal configuration of hardware according to an exemplary embodiment of the present invention.

Hereinafter, a first exemplary embodiment of the present invention is described. FIG. 1 is a block diagram illustrating an internal configuration of hardware in an image forming apparatus according to the exemplary embodiment of the present invention. In the exemplary embodiment, the connection state among individual devices is shown in bus connections.

Figure 2:
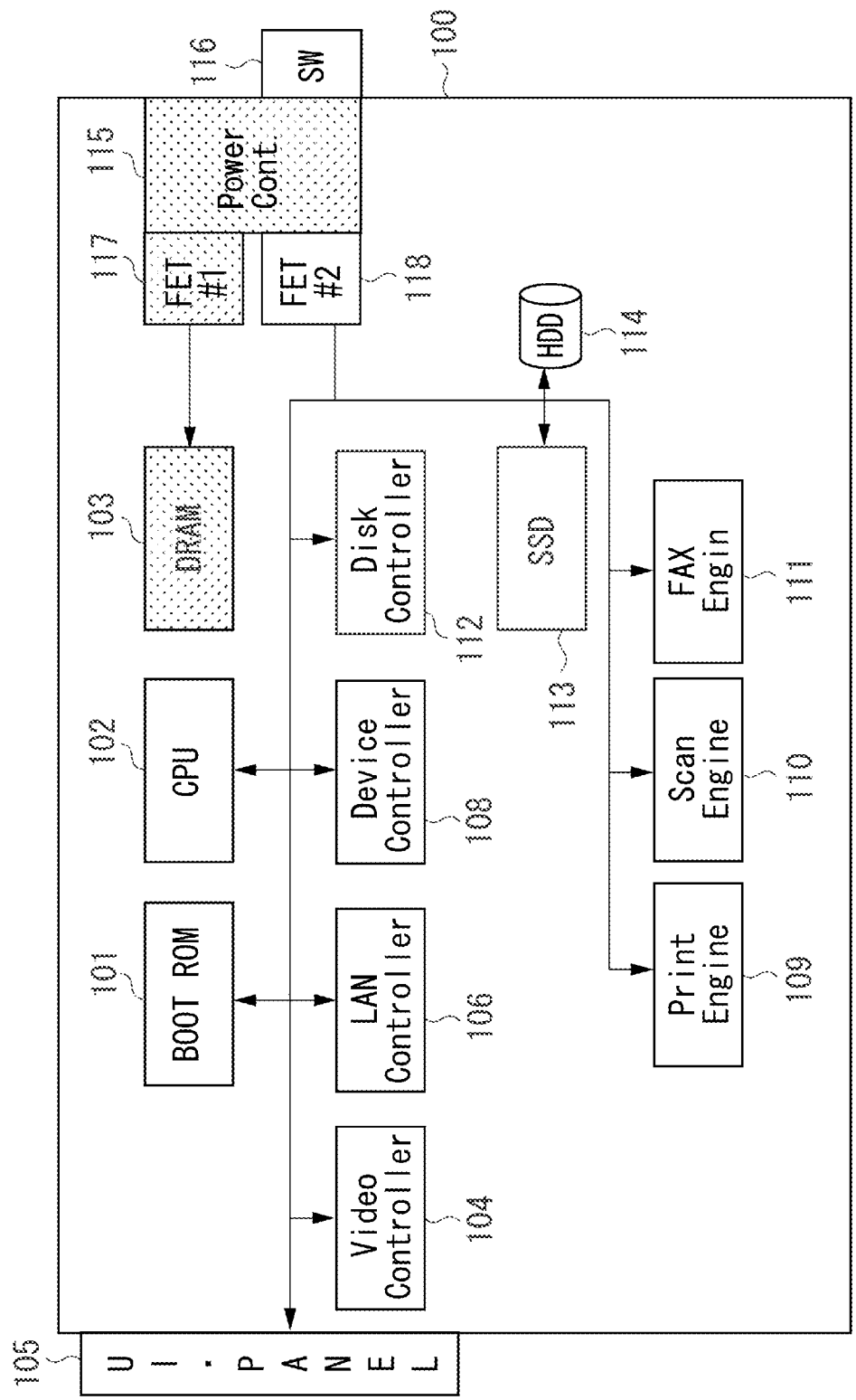
FIG. 2 is a block diagram illustrating a power supply system of the image forming apparatus illustrated in FIG. 1.

FIG. 2 is a block diagram illustrating a power supply system of the image forming apparatus illustrated in FIG. 1. The image forming apparatus according to the exemplary embodiment includes the following two power-saving modes as power-saving modes. A first power-saving mode is a hibernation mode, in the case of transition from a normal power supply state to the power-saving mode, for storing information for restoring the image forming apparatus to the normal power supply state (restoring the image forming apparatus to the state executable of normal job processing) in a non-volatile storage unit. A second power-saving mode is a quick mode, in the case of transition from a normal power supply state to the power-saving mode, for storing information for returning the image forming apparatus to the state executable of normal job processing in a volatile storage unit. The following describes an example in which a hard disk (a second storage unit) is employed as an example of the non-volatile storage unit, and a dynamic random access memory (DRAM) is employed as the volatile storage unit.

In FIG. 1, in response to a turning-on operation of a power switch 116, an image forming apparatus (a multifunction peripheral (MFP)) 100 converts an alternating current into a direct current with a power controller (PowerCont.) 115, and as illustrated in FIG. 2, supplies the electric power to a DRAM 103 via a field-effect transistor (FET) #1 117, and to the other modules via an FET #2 118.

The FET 117 and the FET 118 are configured to function as a switch for turning on and off the power supply. The initial state in which the power switch 116 is turned on is ON (a powered-on state). In response to the power supply, a CPU 102 executes an initialization program stored in a boot read-only memory (ROM) 101.

At the last stage in the initialization processing according to the initialization program stored in the boot ROM 101 by the CPU 102, the CPU 102 copies an apparatus control program stored in a hard disk drive (HDD) 114 to the DRAM 103, and sequentially executes the program. A video controller (Video Controller) 104 controls screen information to be output to an operation panel (a user interface (UI)/PANEL) 105.

A local area network (LAN) controller 106 sends and receives information to and from a network connected via a LAN interface (I/F) 107.

A device controller 108 controls a print engine 109, a scan engine 110, and a facsimile (FAX) engine 111. A disk controller 112 controls a solid state drive (SSD) 113 and the HDD 114 that store program files, data files, and hibernation data.

Figures 3A, 3B, 3C:
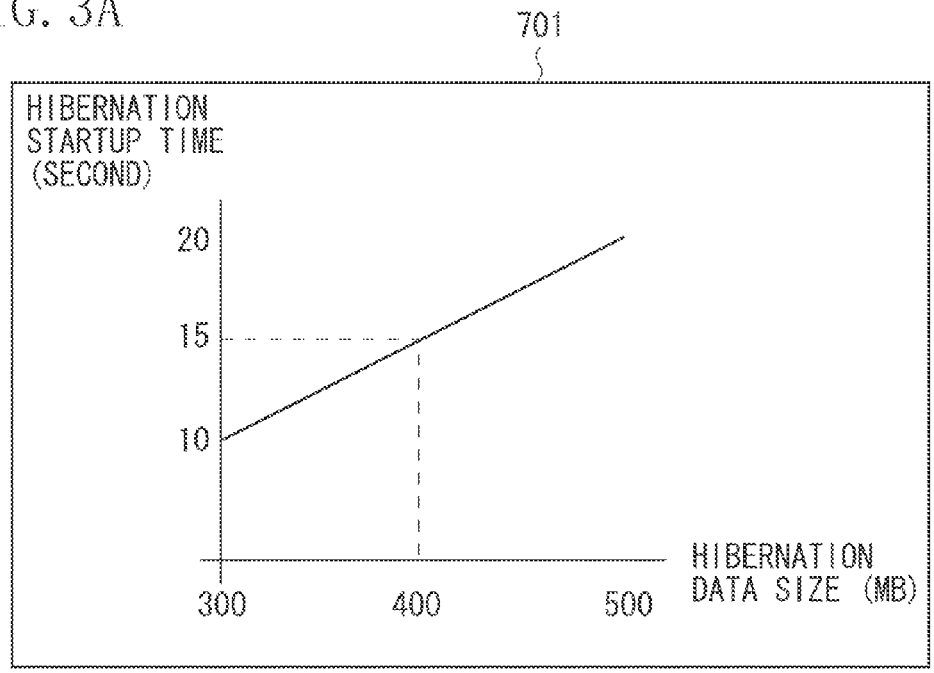
FIGS. 3A, 3B, and 3C illustrate parameters used in hibernation data generation and write-back processing.

FIGS. 3A, 3B, and 3C illustrate parameters used in generation and write-back processing of hibernation data for the image forming apparatus according to the exemplary embodiment. In the exemplary embodiment, parameters that influence the generation and write-back processing of the hibernation data are illustrated.

FIG. 3A is a graph illustrating a correlative relationship 701 between a hibernation data size and a hibernation startup time.

In FIG. 3A, the vertical axis indicates the hibernation startup time (second) and the horizontal axis indicates the hibernation data size (megabyte (MB)).

As illustrated in the drawing, the absolute values vary due to CPU performances, such as operation clocks (frequencies), and data transfer performances of a non-volatile storage unit, such as an HDD for storing the hibernation data. For example, a startup time that takes 10 seconds in a case where the data size is 300 MB requires 20 seconds in a case where the data size is 500 MB. The drawing indicates a tendency that the increasing hibernation data size proportionally increases the startup time.

FIG. 3B illustrates parameters relating to the hibernation processing in the image forming apparatus and having the correlative relationship 701, the parameters being stored in a non-volatile storage unit such as the HDD 114, and fixed with regard to the hardware configuration of the image forming apparatus.

In FIG. 3B, a generation time 702 and a write-back time 703 indicate a time necessary for storing the hibernation data stored in the DRAM 103 in the non-volatile storage unit such as the HDD 114, and a time necessary for writing back the hibernation data stored in the non-volatile storage unit to the DRAM 103, respectively. The times are indicated by seconds per megabyte.

A time threshold 704 is an upper limit of the time (second) necessary for the hibernation processing for restoring the apparatus. A value equal to or less than a processing time at a cold boot is set as the upper limit. A size threshold 705 is a maximum value of hibernation data to be generated. A discrete threshold 706 is an upper limit of the number of data blocks allowed to continue the hibernation processing, the data blocks being allocated to the DRAM stored as the hibernation data.

FIG. 3C illustrates parameters relating to compression of the hibernation data.

In FIG. 3C, a compression rate 707 is an average rate of an output data size to an input data size. The compression rate 707 is used to calculate a size of compressed hibernation data by multiplying a hibernation data size by the rate.

A compression time 708 and a decompression time 709 are times (seconds) necessary for compression and decompression per megabyte, respectively. The compression time 708 and the decompression time 709 are used to calculate times relating to processing to terminate the apparatus and start up the apparatus. The compression rate 707, the compression time 708, and the decompression time 709 vary depending on compression algorism. Consequently, the parameters may be provided to each compression algorism and selectively used.

Apparatus stop processing and apparatus startup processing in the MFP 100 illustrated in FIG. 1 according to the exemplary embodiment will be described.

Figure 4:
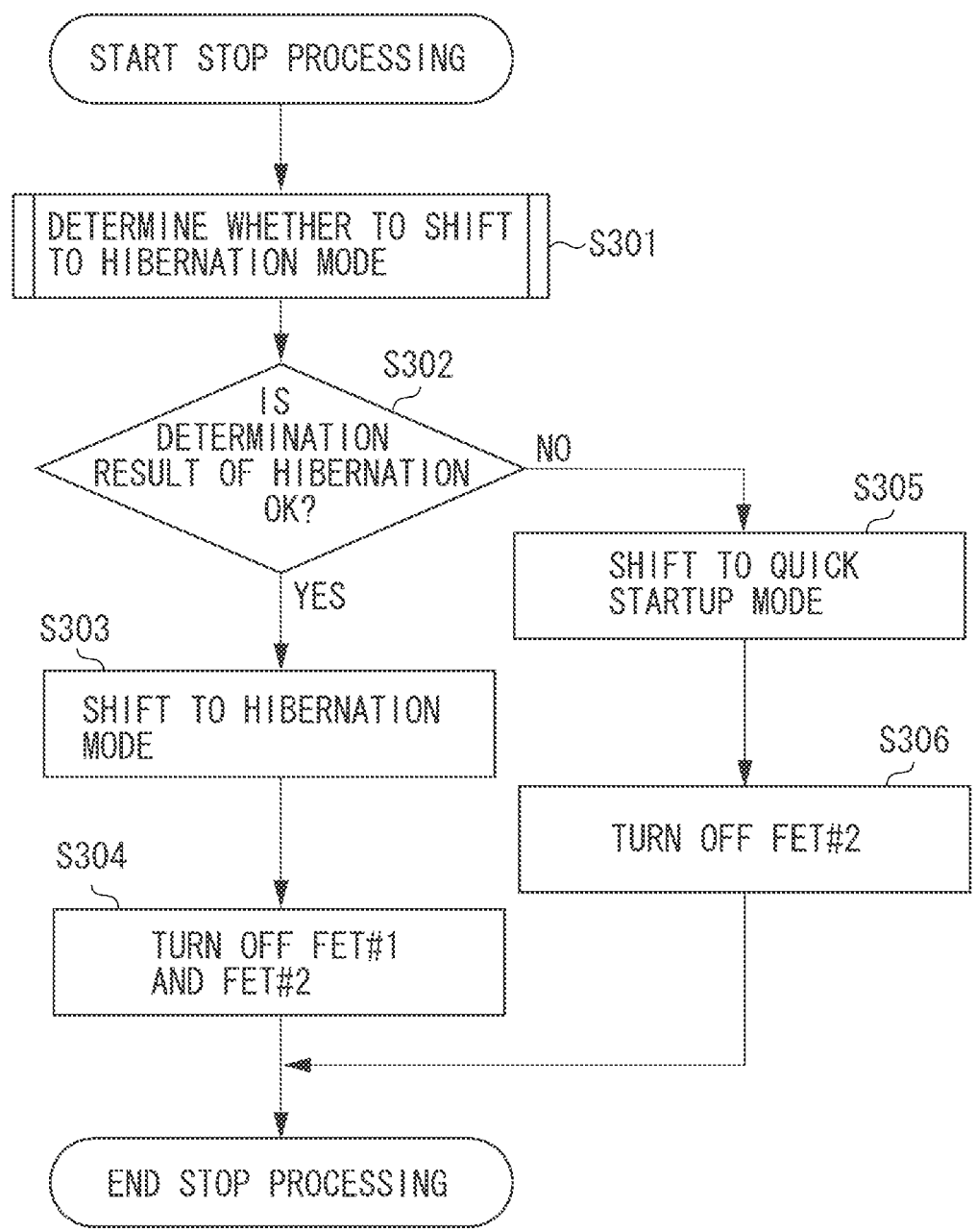
FIG. 4 is a flowchart illustrating a power supply control method for the image forming apparatus.

FIG. 4 is a flowchart illustrating a power supply control method of the image forming apparatus according to the exemplary embodiment. The method is an example of the apparatus stop processing and the hibernation determination processing in the MFP 100.

In response to a turn-off process of the power switch 116 in the MFP 100, a notification is issued from the power controller 115 to the CPU 102, and each step of the apparatus stop processing in the apparatus control program is executed. In the description below, the control is performed according to the apparatus control program.

In step S301, the apparatus control program determines whether to shift the image forming apparatus to a power-saving mode, that is, the hibernation mode in the exemplary embodiment, in a state where the image forming apparatus is not received a job processing request for a predetermined time period. In step S302, the apparatus control program determines whether conditions for shifting the image forming apparatus to the hibernation mode are satisfied (whether a hibernation result notified from a determination processing program illustrated in FIG. 5 to be described below is OK). If the CPU 102 determines that the hibernation OK is notified (YES in step S302), then in step S303, the apparatus control program generates hibernation data, stores the data in the non-volatile region of the HDD 114, or the like, and shifts to the hibernation mode.

In step S304, the apparatus control program shifts the FET 117 and the FET 118 illustrated in FIG. 2 to an OFF state to stop the power supply to all blocks.

Meanwhile, in step S302, if the CPU 102 determines that hibernation NG is notified (NO in step S302), then in step S305, the apparatus control program shifts the power mode to the quick startup mode to stop the image forming apparatus.

In the quick startup mode, register contents of the CPU 102, chips, and the like are stored in the DRAM 103, and the DRAM 103 is put into a self-refresh mode to retain the contents stored in the DRAM 103.

In step S306, the apparatus control program shifts the FET 118 to a disconnected state to stop the power supply to the individual hardware modules connected to the FET 118.

Meanwhile, the electric power is supplied to the DRAM 103, the power controller 115, and the FET 117, which are illustrated in a shaded state in FIG. 2. If the power switch 116 is turned on next time, while the FET 118 is turned on (connected) and the electric power is supplied to each unit, the DRAM 103 is switched from the self-refresh state to a normal power supply state. Then, the register contents stored in the DRAM 103 is written back to instantaneously restore the apparatus to an operating condition.

Figure 5:
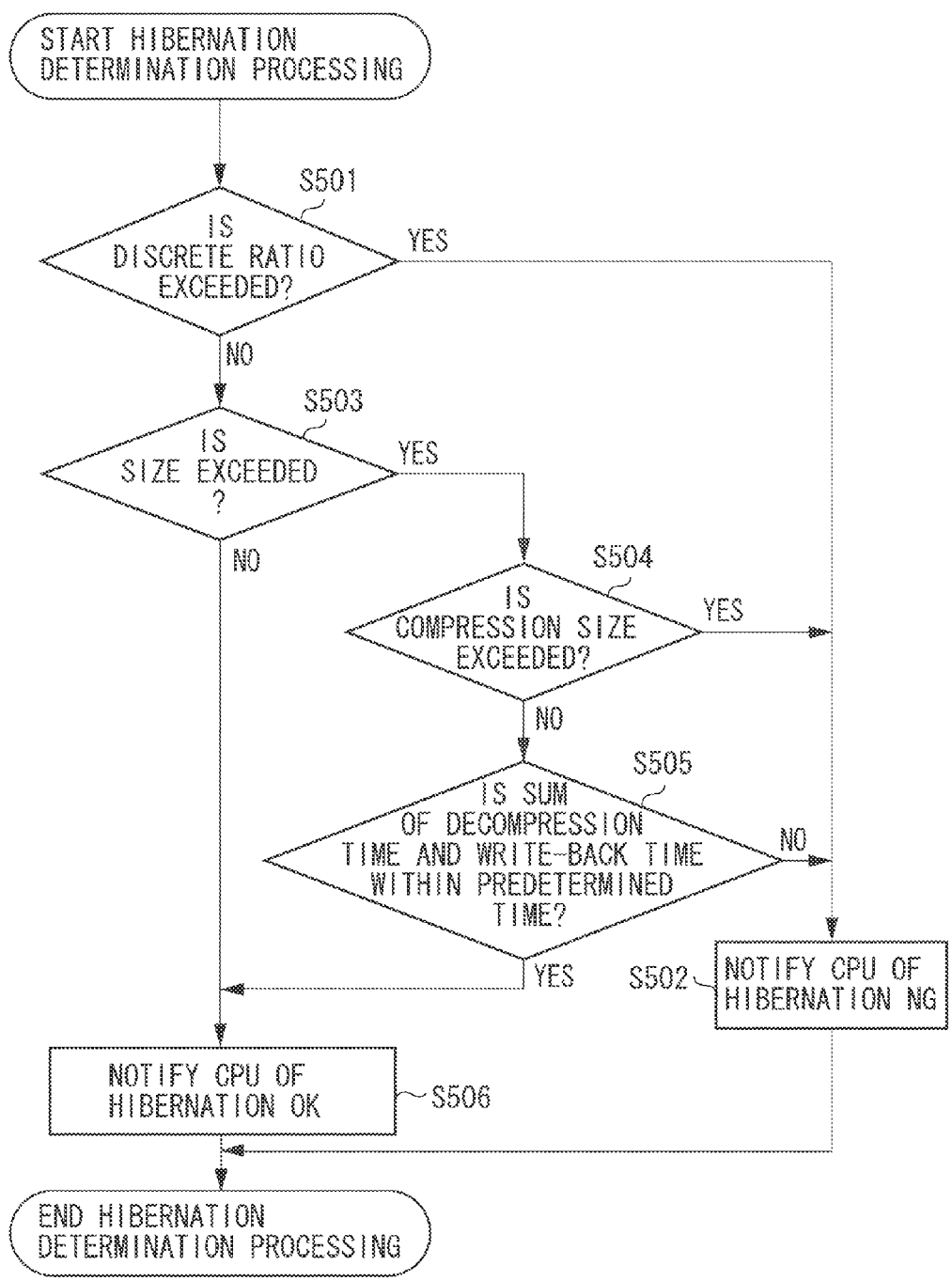
FIG. 5 is a flowchart illustrating a power supply control method for the image forming apparatus.

FIG. 5 is a flowchart illustrating a power control method of the image forming apparatus according to the exemplary embodiment. The method is an example of the hibernation determination processing in step S301 in FIG. 4.

In response to the turn-off process of the power switch 116 in the MFP 100, the notification is issued from the power controller 115 to the CPU 102, and each step in the apparatus stop processing in the apparatus control program is executed. The processing is a hibernation determination processing program (a determination processing program) included in the power supply control program illustrated in FIG. 4 performed by the CPU 102.

In the description below, the control is performed according to the hibernation determination processing program (the determination processing program). In the exemplary embodiment, an example will be described in which the hibernation mode and the power-saving mode are switched depending on a time for shifting to the hibernation mode. The hibernation mode is for shifting the image forming apparatus to the power-saving mode after information necessary for performing the normal job processing is stored in the HDD 114. The quick mode is for the shifting to the power-saving mode after information for performing the normal job processing is stored in the DRAM 103.

In step S501, the determination processing program determines whether the number of the memory blocks on the DRAM 103 to be stored as the hibernation data exceeds a predetermined number (corresponding to the discrete threshold 706 in FIG. 3B). If the determination processing program determines that the number of the memory blocks exceeds the predetermined number (YES in step S501), then in step S502, the determination processing program returns hibernation NG. When the number of memory blocks exceeds the predetermined number, it takes time to perform the hibernation data generation processing and the write-back processing to the memory in the startup processing. The threshold is provided for this reason.

Meanwhile, if the determination processing program determines that the number of the memory blocks is below the predetermined number (NO in step S501), then in step S503, the determination processing program determines whether the size of the hibernation data exceeds the predetermined size (the size corresponding to the size threshold 705 in FIG. 3B). Whether the size of the hibernation data exceeds the predetermined size is determined according to the following steps.

Specifically, in step S504, the determination processing program determines whether the compression size of the hibernation data obtained by multiplying the hibernation data size by the compression rate 707 in FIG. 3C exceeds the predetermined size (the size corresponding to the size threshold 705 in FIG. 3B).

If the determination processing program determines that the compression size exceeds the predetermined size (YES in step S504), then in step S502, the hibernation NG is notified of the apparatus control program. This information is the information to be used for the determination in step S302 in FIG. 4.

In step S504, the determination processing program determines whether the compression data size exceeds the predetermined size. If the determination processing program determines that the compression data size does is below the predetermined size (NO in step S504), then in step S505, the determination processing program determines whether the sum of the decompression time (the value is calculated by multiplying the compression size of the hibernation data by the decompression time 709 in FIG. 3C) and the memory write-back time (the value is calculated by multiplying the hibernation data size by the write-back time 703 in FIG. 3B) is within a predetermined time (the time corresponding to the time threshold 704 in FIG. 3B).

If the determination processing program determines that the compression size exceeds the predetermined size (YES in step S503), in step S502, hibernation NG is notified to the apparatus control program illustrated in FIG. 4. This information is the information to be used for the determination in step S302 in FIG. 4.

In step S505, if the determination processing program determines that the sum is within the predetermined time (YES in step S505), then in step S506, the hibernation OK is returned. The determination processing program determines which of the hibernation OK notified in step S506 and the hibernation NG notified in step S502 is received, in step S302 in FIG. 4. As a result, the processing proceeds to the hibernation mode or to the other mode.

As described above, according to the exemplary embodiment, in the case of transition to the power-saving mode in response to the power shutdown request, the power saving modes are switched between the hibernation mode and the quick mode depending on the shift time for processing the hibernation data.

This enables the apparatus to efficiently perform the power-saving control for reducing startup time in power supply recovery and power consumption.

Detailed examples of switching the power-saving modes according to the exemplary embodiment will be described in the following examples.

[First Power Supply Control]

In step S505, the time for shifting to the hibernation mode is calculated based on the time for processing the hibernation data to be stored in a first storage unit. If the shift time exceeds a predetermined threshold, the power mode is switched to the quick mode. If the shift time is below the predetermined threshold, the power mode is shifted to the hibernation mode.

[Second Power Supply Control]

A compression data size is calculated by compressing hibernation data. If the calculated compression data size is smaller than a predetermined size, the power mode is shifted to the hibernation mode. If the compression data size is larger than the predetermined size, the power mode is shifted to the quick mode.

[Third Power Supply Control]

The number of the data blocks in the DRAM 103 is calculated. If the calculated number of the data blocks is smaller than a predetermined size, the power mode is shifted to the hibernation mode. If the number of the data blocks is larger than the predetermined size, the power mode is shifted to the quick mode.

Figure 6:
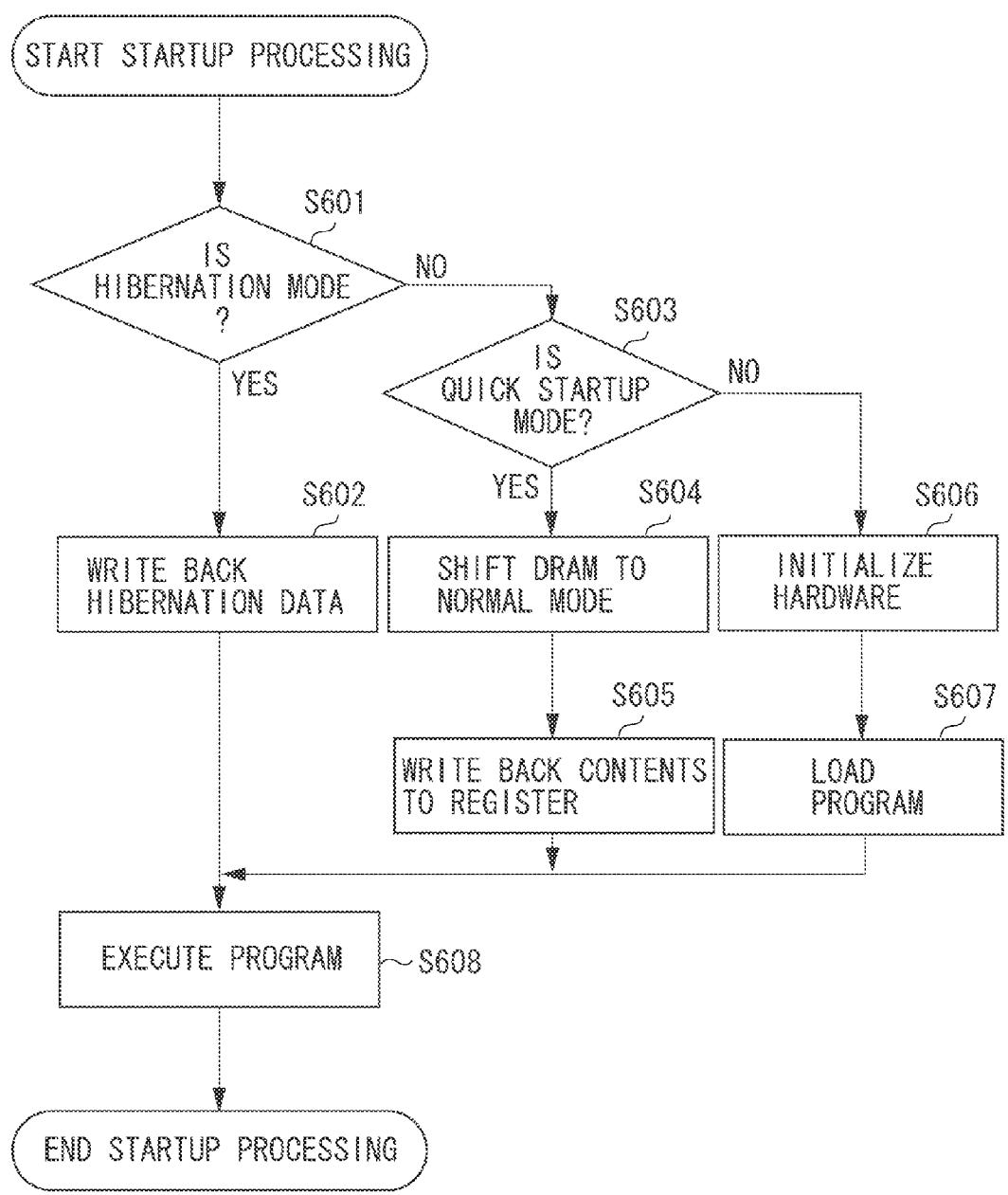
FIG. 6 is a flowchart illustrating a power supply control method for the image forming apparatus.

FIG. 6 is a flowchart illustrating a power control method of the image forming apparatus according to the exemplary embodiment. The exemplary embodiment is an example of apparatus startup processing performed in response to the turn-on operation of the power switch 116 illustrated in FIG. 1. In the description below, the control is performed according to then apparatus control program. In step S601, the apparatus control program refers to a flag indicating a startup mode stored in the power controller 115, and determines whether the startup mode is set to the hibernation mode. The startup mode is provided as a part of the processing for shifting to the hibernation mode in step S303 or the quick startup mode in step S305 in FIG. 4.

In step S601, if the apparatus control program determines that the startup mode of the power controller 115 is the hibernation mode (YES in step S601), the process proceeds to step S602. In step S602, the device control program writes back the hibernation data stored in the non-volatile region such as the HDD 114 in step S303 to the register and the memory. Then in step S608, a device control program is executed to restore the apparatus to an operating state.

In step S601, if the apparatus control program determines that the startup mode is not set to the hibernation mode (NO in step S601), then in step S603, the apparatus control program refers to the flag indicating the startup mode stored in the power controller 115 to determine whether the startup mode is set to the quick startup mode. If the apparatus control program determines that the startup mode is the quick startup mode (YES in step S603), then in step S604, the apparatus control program shifts the DRAM 103, which has shifted to the self-refresh mode in step S305, to the normal mode.

In step S605, the apparatus control program writes back the register contents stored in the DRAM 103 by the processing in step S305 to the register. Then in step S608, the apparatus control program executes the device control program and restores the apparatus to an operating state.

In step S603, if the apparatus control program determines that the quick startup mode is not set (NO in step S603), the startup processing is a cold boot, and the process proceeds to step S606. In step S606, the apparatus control program initializes the hardware, and then in step S607, loads the device control program in the DRAM 103. In step S608, the apparatus control program executes the device control program to set the apparatus to an operating state, and ends the startup processing.

According to the exemplary embodiment, in the hibernation data generation processing performed as the stop processing of the image forming apparatus, based on the number of the data on the DRAM to be the target of the generation processing and the data size, if the apparatus determines that a certain time is necessary for the next apparatus startup processing, the apparatus stops the generation of the hibernation data. Alternatively, the apparatus stores necessary information in a volatile memory (DRAM), and shifts to the quick startup mode, in which the power supply to components other than the DRAM and the power controller 115 is stopped.

The processing prevents the apparatus from spending more time than necessary on the hibernation processing. As a result, even in an environment where an on/off operation of the power switch is frequently performed, that is, the startup and stop processing of the apparatus is frequently performed, the time necessary for the startup of the apparatus may be reduced.

Hereinafter, a second exemplary embodiment is described. In the first exemplary embodiment, if the hibernation NG is notified in step S302 in FIG. 4, the power mode is shifted to the quick startup mode. In the quick startup mode, however, the DRAM 103 operates in the self-refresh mode, and the power controller 115 is set to the powered-on state. As a result, even if the apparatus is in the power-saving state, as compared to the hibernation mode in which the power supply is stopped, more electric power is consumed.

Figure 7:
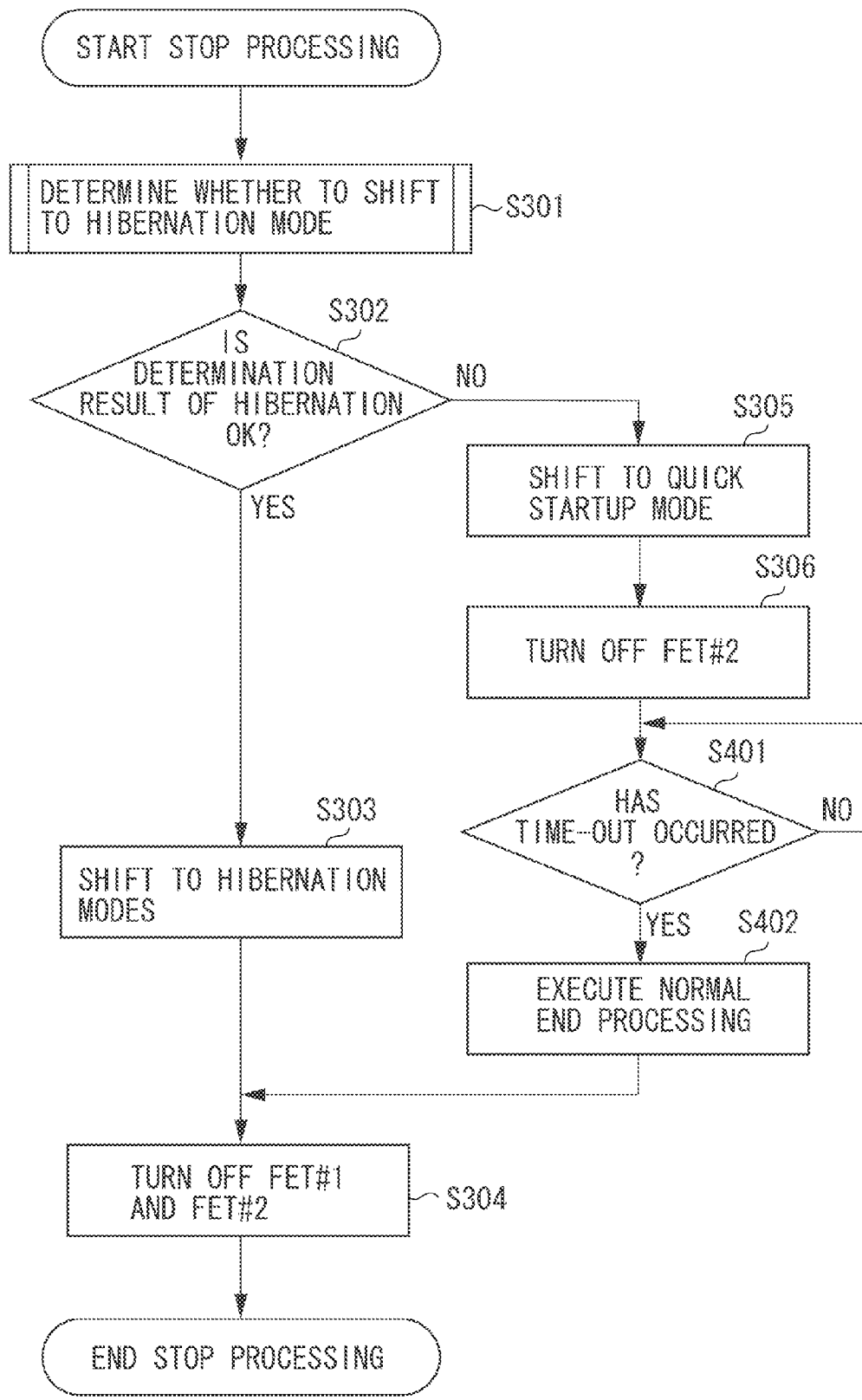
FIG. 7 is a flowchart illustrating a power supply control method for the image forming apparatus.

FIG. 7 is a flowchart illustrating a power supply control method of the image forming apparatus according to the exemplary embodiment. The method is an example of the apparatus stop processing, the hibernation determination processing, and the other processing in the MFP 100. In response to the turn-off process of the power switch 116 in the MFP 100, a notification is issued from the power controller 115 to the CPU 102, and each step in the apparatus stop processing in the apparatus control program is executed. Hereinafter, processes different from those illustrated in FIG. 4 will be described. In the description below, the processing is performed according to the apparatus control program. In the description below, if a power mode is switched to the quick mode, after a predetermined time has passed in step S402, the normal end processing is executed to stop the power supply from the power source.

In step S305 in FIG. 4, the power mode shifts to the quick startup mode. In step S306, the FET 118 is turned off. In step S401, a timer under the control of the power controller 115 is started, and the apparatus control program determines whether the power switch has not turned on within a predetermined time, that is, whether time-out has occurred. If the apparatus control program determines that the time-out has occurred (YES in step S401), then in step S402, the apparatus control program performs control such that the normal end processing is to be executed. Then, the processing returns to step S304.

As described above, according to the exemplary embodiment, a time period that has passed since the power-off of the power switch 116 and the shift of the mode to the quick startup mode is measured by the timer, and if a predetermined time has passed, the normal stop processing is started. The processing enables reduction in the power consumption even in an environment where the time period from the turn-off operation to the turn-on operation of the power switch 116 is long, in other words, where, once the image forming apparatus is stopped, the time period to the next startup of the image forming apparatus is long, the power consumption may be reduced.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-088152 filed Apr. 9, 2012, which is hereby incorporated by reference herein in its entirety.

What is claimed is:

1. An image forming apparatus comprising:
a first volatile storage unit configured to store information for returning the image forming apparatus to a normal startup state;
a second non-volatile storage unit configured to store the information for returning the image forming apparatus to the normal startup state; and
a control unit configured to, when the image forming apparatus is shifted to a power-saving mode, shift the image forming apparatus to a hibernation mode in a case where duration required for shifting the image forming apparatus to the hibernation mode is within a predetermined time period and shift the image forming apparatus to a quick mode in a case where the duration required for shifting the image forming apparatus to the hibernation mode is not within the predetermined time period, the hibernation mode in which the control unit causes the second non-volatile storage unit to store therein the information for returning the image forming apparatus to the normal startup state, the quick mode in which the control unit causes the first volatile storage unit to store therein the information for returning the image forming apparatus to the normal startup state
wherein the control unit is configured to, when the image forming apparatus is shifted to the power-saving mode, shift the image forming apparatus to the quick mode in a case where the information that is to be stored in the second non-volatile storage unit is stored in memory blocks, a number of which exceeds a predetermined number in the first volatile storage unit.

2. The image forming apparatus according to claim 1, wherein if the image forming apparatus is shifted to the quick mode, power is supplied to the first volatile storage unit and is not supplied to the second non-volatile storage unit from a power source.

3. The image forming apparatus according to claim 1, wherein the second non-volatile storage unit includes a hard disk drive.

4. A method for controlling an image forming apparatus, the image forming apparatus including a first volatile storage unit configured to store information for returning the image forming apparatus to a normal startup state, and a second non-volatile storage unit configured to store the information for returning the image forming apparatus to the normal startup state, the method comprising:
when the image forming apparatus is shifted to a power-saving mode, shifting the image forming apparatus to a hibernation mode in a case where duration required for shifting the image forming apparatus to the hibernation mode is within a predetermined time period and shift the image forming apparatus to a quick mode in a case where the duration required for shifting the image forming apparatus to the hibernation mode is not within the predetermined time period, the hibernation mode in which the control unit causes the second non-volatile storage unit to store therein the information for returning the image forming apparatus to the normal startup state, the quick mode in which the control unit causes the first volatile storage unit to store therein the information for returning the image forming apparatus to the normal startup state,
wherein when the image forming apparatus is shifted to the power-saving mode, the image forming apparatus is shifted to the quick mode in a case where the information that is to be stored in the second non-volatile storage unit is stored in memory blocks, a number of which exceeds a predetermined number in the first volatile storage unit.

5. A non-transitory computer-readable storage medium storing a program that causes a computer to execute the method according to claim 4.

6. An image forming apparatus comprising:
a first volatile storage unit configured to store information for returning the image forming apparatus to a normal startup state;
a second non-volatile storage unit configured to store the information for returning the image forming apparatus to the normal startup state; and
a control unit configured to, when the image forming apparatus is shifted to a power-saving mode, shift the image forming apparatus to a hibernation mode in a case where duration required for shifting the image forming apparatus to the hibernation mode is within a predetermined time period and shift the image forming apparatus to a quick mode in a case where the duration required for shifting the image forming apparatus to the hibernation mode is not within the predetermined time period, the hibernation mode in which the control unit causes the second non-volatile storage unit to store therein the information for returning the image forming apparatus to the normal startup state, the quick mode in which the control unit causes the first volatile storage unit to store therein the information for returning the image forming apparatus to the normal startup state,
wherein the control unit is configured to, when the image forming apparatus is shifted to the power-saving mode, shift the image forming apparatus to the hibernation mode in a case where a size of the information that is to be stored in the second non-volatile storage unit is smaller than a predetermined size.

7. An image forming apparatus comprising:
a first volatile storage unit configured to store information for returning the image forming apparatus to a normal startup state;
a second non-volatile storage unit configured to store the information for returning the image forming apparatus to the normal startup state; and
a control unit configured to, when the image forming apparatus is shifted to a power-saving mode, shift the image forming apparatus to a hibernation mode in a case where duration required for shifting the image forming apparatus to the hibernation mode is within a predetermined time period and shift the image forming apparatus to a quick mode in a case where the duration required for shifting the image forming apparatus to the hibernation mode is not within the predetermined time period, the hibernation mode in which the control unit causes the second non-volatile storage unit to store therein the information for returning the image forming apparatus to the normal startup state, the quick mode in which the control unit causes the first volatile storage unit to store therein the information for returning the image forming apparatus to the normal startup state,
wherein the control unit configured to, when the image forming apparatus is shifted to the power-saving mode, shift the image forming apparatus to the quick mode in a case where a compressed size of the information that is to be stored in the second non-volatile storage unit exceeds a predetermined size.

8. A method for controlling an image forming apparatus, the image forming apparatus including a first volatile storage unit configured to store information for returning the image forming apparatus to a normal startup state, and a second non-volatile storage unit configured to store the information for returning the image forming apparatus to the normal startup state, the method comprising:
- when the image forming apparatus is shifted to a power-saving mode, shifting the image forming apparatus to a hibernation mode in a case where duration required for shifting the image forming apparatus to the hibernation mode is within a predetermined time period and shift the image forming apparatus to a quick mode in a case where the duration required for shifting the image forming apparatus to the hibernation mode is not within the predetermined time period, the hibernation mode in which the control unit causes the second non-volatile storage unit to store therein the information for returning the image forming apparatus to the normal startup state, the quick mode in which the control unit causes the first volatile storage unit to store therein the information for returning the image forming apparatus to the normal startup state,
- wherein when the image forming apparatus is shifted to the power-saving mode, the image forming apparatus is shifted to the hibernation mode in a case where a size of the information that is to be stored in the second non-volatile storage unit is smaller than a predetermined size.

9. A method for controlling an image forming apparatus, the image forming apparatus including a first volatile storage unit configured to store information for returning the image forming apparatus to a normal startup state, and a second non-volatile storage unit configured to store the information for returning the image forming apparatus to the normal startup state, the method comprising:
- when the image forming apparatus is shifted to a power-saving mode, shifting the image forming apparatus to a hibernation mode in a case where duration required for shifting the image forming apparatus to the hibernation mode is within a predetermined time period and shift the image forming apparatus to a quick mode in a case where the duration required for shifting the image forming apparatus to the hibernation mode is not within the predetermined time period, the hibernation mode in which the control unit causes the second non-volatile storage unit to store therein the information for returning the image forming apparatus to the normal startup state, the quick mode in which the control unit causes the first volatile storage unit to store therein the information for returning the image forming apparatus to the normal startup state,
- wherein when the image forming apparatus is shifted to the power-saving mode, the image forming apparatus is shifted to the quick mode in a case where a compressed size of the information that is to be stored in the second non-volatile storage unit exceeds a predetermined size.

* * * * *